UNITED STATES PATENT OFFICE 2,583,517

PROCESS FOR EFFECTING COUPLING REACTIONS

Peter Pieth, Basel, Switzerland, assignor to Ciba Limited, Basel, Switzerland, a Swiss firm No Drawing. Application February 25, 1948, Serial No. 10,906. In Switzerland November 28, 1945

Section 1, Public Law 690, August 8, 1946
Patent expires November 28, 1965

3 Claims. (Cl. 260—197)

It is well known that ortho-hydroxydiazo compounds are comparatively stable and as a rule can stand rather severe conditions of coupling without undue decomposition occurring.

However, there are some coupling reactions which hitherto could not be carried out in a satisfactory manner because there were always losses without an obvious cause.

It has now been found that coupling reactions between ortho-hydroxydiazo compounds and 1:5-dihydroxynaphthalenes are carried out with advantage in a medium containing naphthalene sulfonic acid salts.

As ortho-hydroxydiazo compounds according to the present process, any diazotized ortho-hydroxyamino-aryl-compound, for instance, of the benzene series, may be used. The said ortho-hydroxydiazo compounds may contain further substituents such as are usual in azo dyestuffs, for instance, nitro and sulfonic acid groups, halogen atoms, etc. Particular mention may be made of diazotized 2-amino-1-hydroxybenzene-4-sulfonic acid and diazotized 2-amino-1-hydroxy-4-chlorobenzene-6-sulfonic acid. With particular advantage the present process may be applied to the coupling of 1:5-dihydroxynaphthalenes which are free from sulfonic acid groups, for instance, 1:5-dihydroxy naphthalene itself, without any further substituents.

According to the present invention the coupling reaction is carried out in a medium containing, of course, the components taking part in the coupling reaction, the alkali necessary for the coupling reaction, and, in addition, naphthalene sulfonic acid salts. In many cases it is useful to add a naphthalene sulfonic acid either to the diazo compound or, if desired, to the ortho-hydroxyamino-aryl compound before diazotizing is effected. In many instances a crude naphthalene sulfonic acid solution, obtained by the sulfonation of naphthalene without further purification, may be used. The said naphthalene sulfonic acid may contain as main constituent naphthalene-1-sulfonic acid. Such a crude acid contains a certain amount of sulfuric acid and in view of this fact can be substituted for the acid otherwise necessary for diazotizing.

Since the coupling reaction must be carried out in an alkaline medium, on neutralizing the diazotization mixture, the corresponding naphthalene sulfonic acid salts will be formed anyway.

The coupling reaction can be carried out, under conditions otherwise usual, in a medium containing a suitable alkali, for instance an alkali metal carbonate or an alkali metal hydroxide. Depending on the particular circumstances coupling may be effected at a relatively low temperature (between 0 and 5° C.), or at room temperature, or even at a raised temperature. If desired, the temperature may be raised during the coupling reaction.

It is a feature of the present process that an improvement is brought about in the yield and/or the purity of the dyestuff.

Example 1

37.8 parts of 2-amino-1-hydroxybenzene-4-sulfonic acid are dissolved in 150 parts of water with the addition of such an amount of sodium carbonate that a feeble alkaline reaction ensues. 75 parts by volume of a crude solution of naphthalene sulfonic acid of about 30% strength are added, which is obtained by diluting a reaction mass containing mostly naphthalene-1-sulfonic acid and prepared by direct sulfonation of naphthalene. The reaction mixture is cooled to 5° C. by an addition of ice, then 13.8 parts of solid sodium nitrite are added in small portions and the whole is stirred for ½ hour. If the reaction mixture happens to contain free nitrous acid a small amount of 2-amino-1-hydroxybenzene-4-sulfonic acid is added.

32 parts of 1:5-dihydroxynaphthalene in the form of a finely ground aqueous paste of about 30% strength is added to the reaction mixture containing the diazo compound mentioned above. By addition of 300 parts of ice the whole is cooled down to about 0° C., 109 parts of caustic soda solution of 30% strength are then added as a single addition and the whole is stirred for 2 hours at 0–2° C. After coupling is finished the dyestuff solution is neutralized by means of 92 parts of concentrated hydrochloric acid, warmed to 50° C. and the dyestuff is precipitated by the addition of 190 parts of sodium chloride. After stirring for some time the dyestuff of the formula

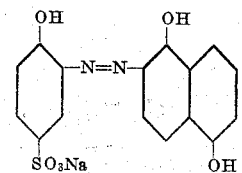

is filtered and dried at 80–85° C. in vacuo. The dyestuff described in U. S. Pat. No. 722,715 is obtained in substantially increased yield.

Example 2

44.7 parts of 2-amino-1-hydroxy-4-chlorobenzene-6-sulfonic acid in the form of a paste feebly acid with sulfuric acid are stirred with 100 parts of water. 70 parts by volume of a naphthalene-1-sulfonic acid solution of 30% strength (see Example 1) are added and the reaction mixture is cooled to 3° C. by the addition of ice. Then 13.8 parts finely ground solid sodium nitrite is added in small portions until free nitrous acid is present and the whole is stirred for ½ hour. Any excess of nitrous acid is removed by the addition of a small part of the amine mentioned above. Then 32 parts of 1,5-dihydroxynaphthalene as a finely ground aqueous paste of about 30% strength are added and the reaction mixture is cooled to 0° C. by the addition of 100 parts of ice. Then 100 parts of caustic soda solution of 30% strength are added as a single addition and the whole is stirred at 0-2° C. When the coupling reaction is finished the dyestuff solution is neutralized by means of 80 parts of concentrated hydrochloric acid. The whole is warmed up to 50° C. and the dyestuff is precipitated by the addition of 180 parts of sodium chloride. After cooling down to 25° C. the dyestuff is filtered and dried at 80° C. in vacuo.

What I claim is:

1. In the process for coupling a member selected from the group consisting of diazotized 2 - amino - 1 - hydroxybenzene - 4 - sulfonic acid and diazotized 2-amino-1-hydroxy-4-chlorobenzene-6-sulfonic acid with 1,5-dihydroxynaphthalene, the improvement which consists in reacting the said member and the 1,5-dihydroxynaphthalene in an aqueous alkaline medium containing an alkali metal salt of naphthalene-1-sulfonic acid.

2. In the process for coupling diazotized 2 - amino - 1 - hydroxybenzene - 4 - sulfonic acid with 1,5-dihydroxynaphthalene, the improvement which consists in reacting the said diazotized 2 - amino - 1 - hydroxybenzene - 4-sulfonic acid and the 1,5-dihydroxynaphthalene in an aqueous alkaline medium containing an alkali metal salt of naphthalene-1-sulfonic acid.

3. In the process for coupling diazotized 2 - amino - 1 - hydroxy - 4 - chlorobenzene - 6-sulfonic acid with 1,5-dihydroxynaphthalene, the improvement which consists in reacting the said diazotized 2 - amino - 1 - hydroxy - 4 - chlorobenzene-6-sulfonic acid and the 1,5-dihydroxynaphthalene in an aqueous alkaline medium containing an alkali metal salt of naphthalene-1-sulfonic acid.

PETER PIETH.

REFERENCES CITED

The following references are of record in the file of this patent:

UNITED STATES PATENTS

| Number | Name | Date |
| --- | --- | --- |
| 722,715 | Kahn | Mar. 17, 1903 |
| 726,695 | Kahn | Apr. 28, 1903 |
| 1,629,906 | Montmollin et al. | May 24, 1927 |
| 1,847,650 | Immerheiser et al. | Mar. 1, 1932 |